United States Patent
Hada et al.

(10) Patent No.: US 7,219,578 B2
(45) Date of Patent: May 22, 2007

(54) FLYWHEEL

(75) Inventors: Masatoshi Hada, Nagoya (JP);
Noriyoshi Kato, Nagoya (JP);
Fumiyuki Suzuki, Nagoya (JP)

(73) Assignee: Aichi Kikai Kogyo Kabushiki Kaisha, Aichi (JP)

( * ) Notice: Subject to any disclaimer, the term of this patent is extended or adjusted under 35 U.S.C. 154(b) by 194 days.

(21) Appl. No.: 10/528,424

(22) PCT Filed: Nov. 25, 2003

(86) PCT No.: PCT/JP03/15048

§ 371 (c)(1),
(2), (4) Date: Mar. 18, 2005

(87) PCT Pub. No.: WO2004/051115

PCT Pub. Date: Jun. 17, 2004

(65) Prior Publication Data

US 2006/0053958 A1 Mar. 16, 2006

(30) Foreign Application Priority Data

Dec. 4, 2002 (JP) .............................. 2002-353150

(51) Int. Cl.
*F16C 15/00* (2006.01)
*F16D 3/00* (2006.01)
(52) U.S. Cl. ..................... 74/572.2; 74/433.5; 464/98
(58) Field of Classification Search .............. 74/433.5, 74/595, 449, 572.2; 188/218 R; 464/98; 192/200, 70.16; F16C 15/00
See application file for complete search history.

(56) References Cited

U.S. PATENT DOCUMENTS

| 1,800,883 | A | * | 4/1931 | Booth | 188/218 R |
|---|---|---|---|---|---|
| 2,719,438 | A | * | 10/1955 | Schiefer | 74/433.5 |
| 4,462,269 | A | * | 7/1984 | Inglis | 74/433.5 |
| 4,650,050 | A | | 3/1987 | Alas et al. | |
| 5,323,665 | A | * | 6/1994 | Rediker, Jr. | 74/574.2 |
| 5,367,916 | A | * | 11/1994 | Bevc et al. | 74/449 |
| 5,465,635 | A | * | 11/1995 | Kono et al. | 74/595 |
| 5,720,665 | A | | 2/1998 | Douoman | |
| 6,039,651 | A | * | 3/2000 | Fukushima et al. | 464/98 |
| 6,131,486 | A | | 10/2000 | Doman | |
| 6,352,008 | B1 | * | 3/2002 | Matsuoka et al. | 74/433.5 |

FOREIGN PATENT DOCUMENTS

| EP | 0984184 | 3/2000 |
|---|---|---|
| GB | 2345332 | 7/2000 |
| JP | 02-51746 | 4/1990 |
| JP | 06-074301 | 3/1994 |
| JP | 06-51590 | 7/1994 |
| JP | 93-10663 | 12/1997 |

* cited by examiner

*Primary Examiner*—Vinh T. Luong
(74) *Attorney, Agent, or Firm*—Dennison, Schultz & MacDonald

(57) ABSTRACT

In a flywheel 2, a central part of a thin plate portion 3 having a flywheel mass provided on an outer peripheral side of the plate portion is joined to an end surface of a crankshaft 1 through a plurality of bolts 7 disposed annularly at intervals. Within a contact zone of a substantially polygon defined by linking each center of the bolts 7 with straight lines excluding the bearing surfaces of the bolts 7, the plate portion 3 has a non-contacting part S2 in a followed fashion set not to contact with the end surface of the crankshaft 1, and the area of the non-contacting part S2 is set to be 40% to 75% of the whole area of the contact zone.

7 Claims, 17 Drawing Sheets

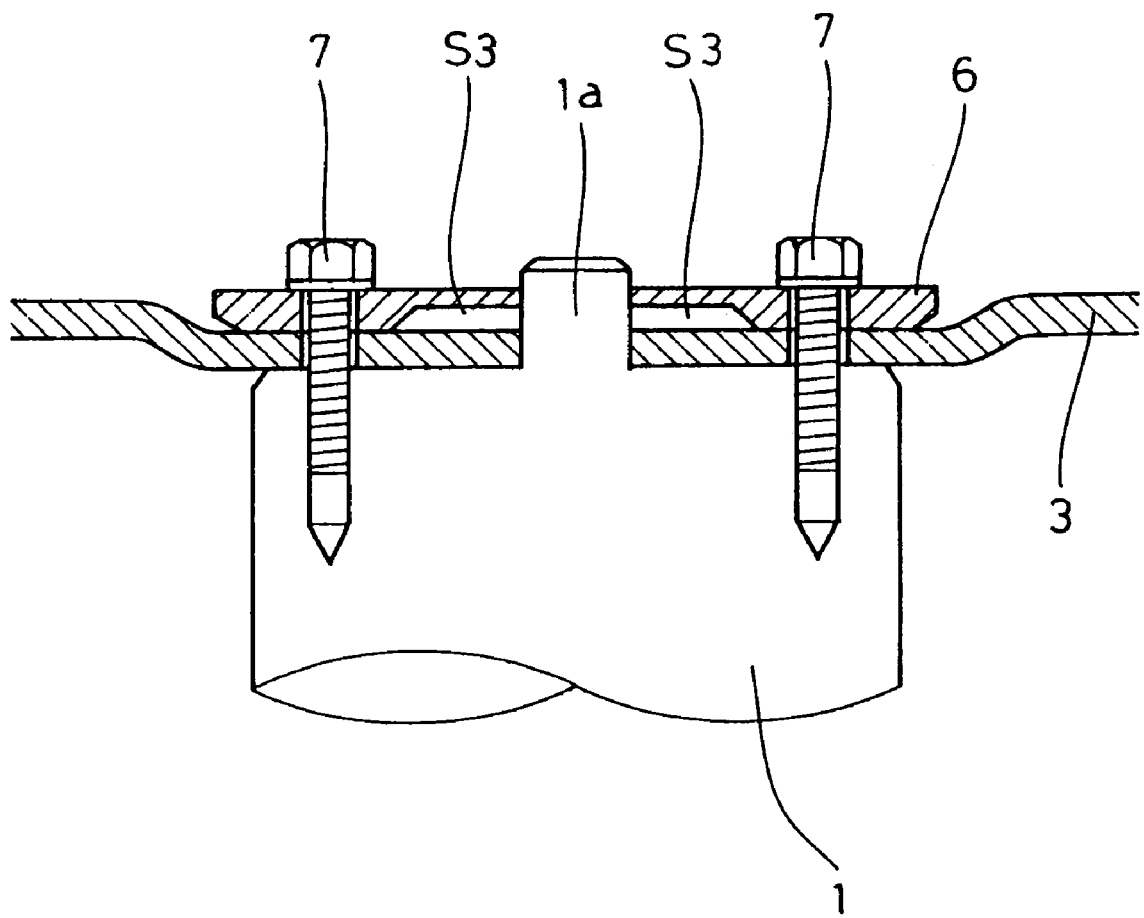
F I G. 4

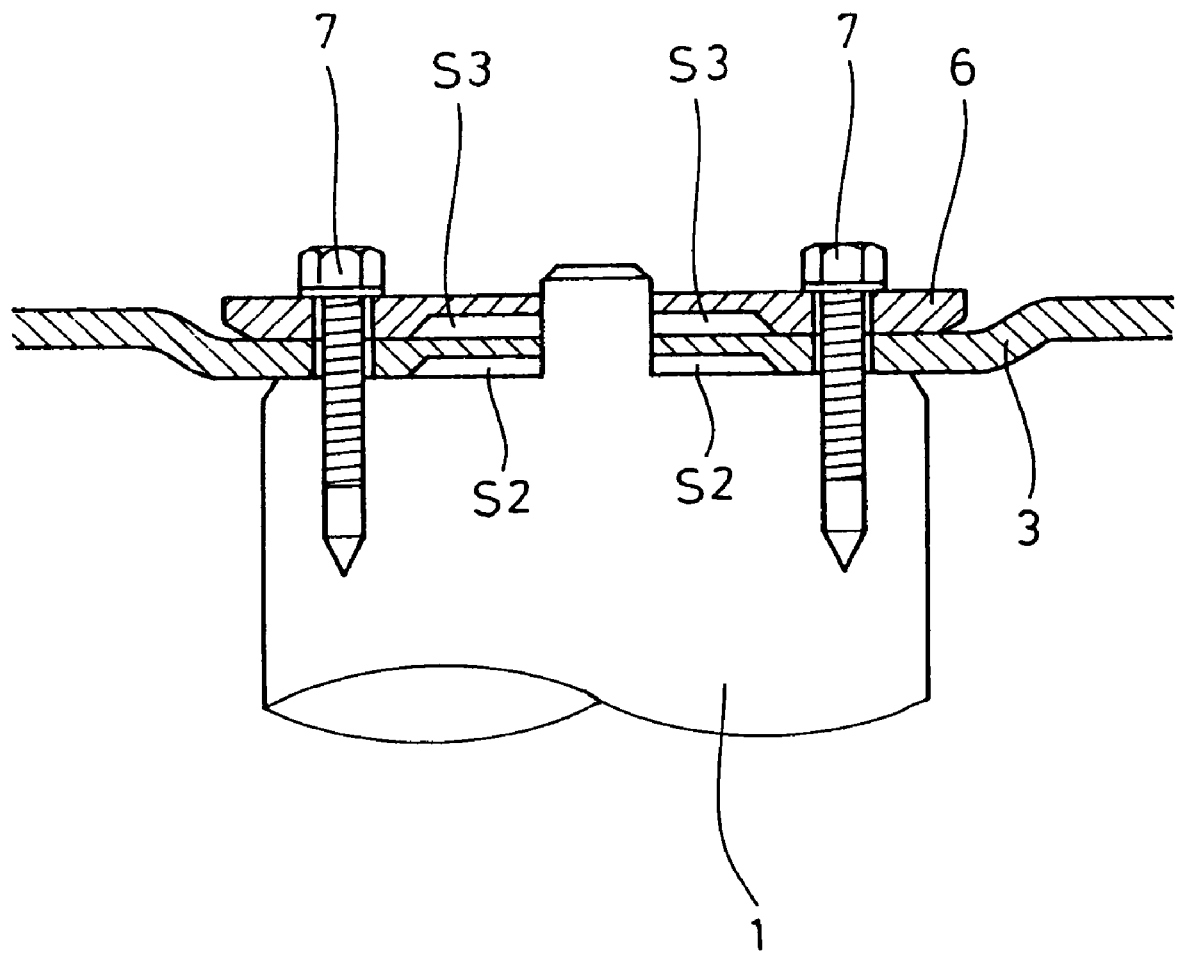
F I G. 5

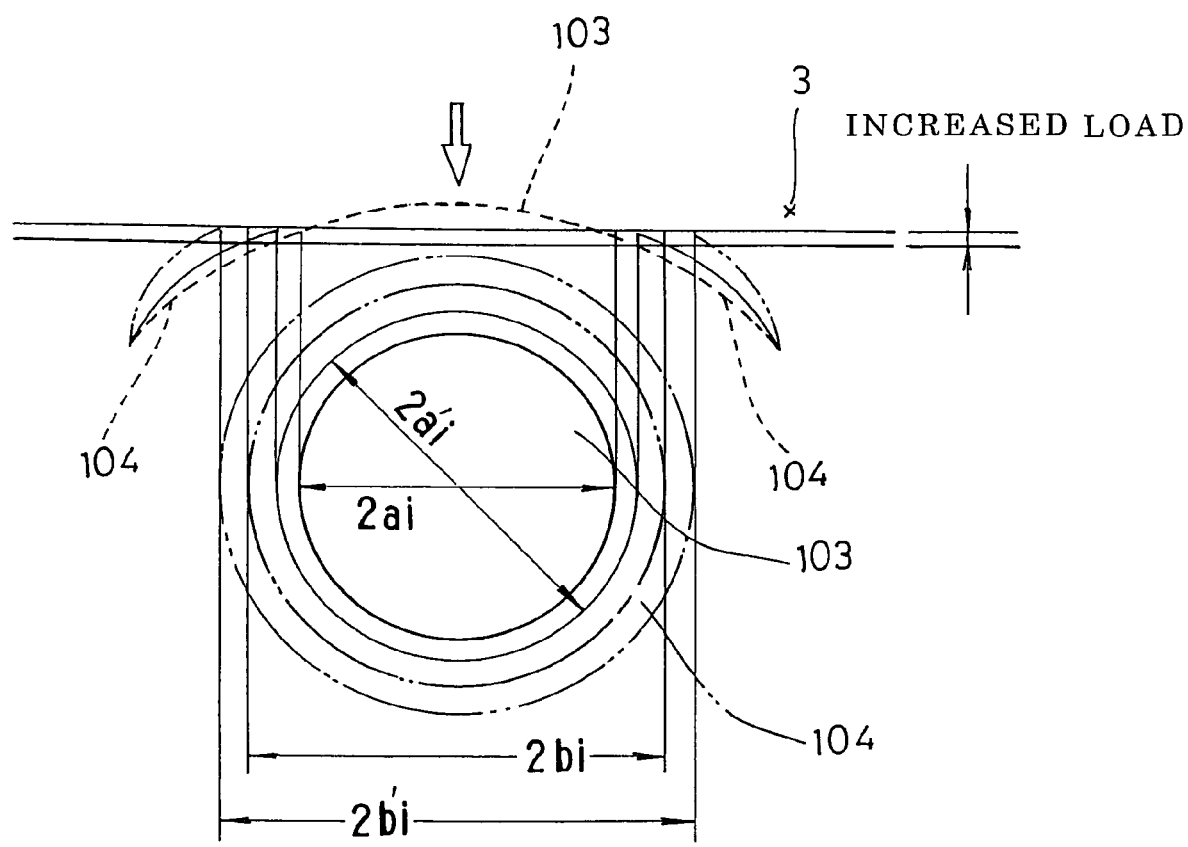
F I G. 11

FLYWHEEL

This application is a filing under 35 U.S.C. 371 of PCT/JP2003/015048 filed Nov. 25, 2003.

FIELD OF THE INVENTION

The present invention relates to a flywheel joined to the end surface of a crankshaft through bolts.

PRIOR ART

In a case of the prior art, the crankshaft of an internal combustion engine has the amount of imbalance due to the functional property, so that a counterweight is provided in order to negate this amount of imbalance. However, depending on an arrangement of engine cylinders, there is a case that it is impossible to negate the amount of imbalance in a certain order to the rotating speed of an engine. This inertia force plus the explosion pressure from the piston act on the crankshaft as twisting and bending force, so that there are generated the bending and twisting of the crankshaft itself. Accordingly, due to the generation of beating noise on the bearing portion of the crankshaft and the increase of the amount of swinging on the end surface of the crankshaft, the transmission connected to the crankshaft through a clutch was in danger of causing a vibration.

On this account, the rigidity of the crankshaft is improved so as to reduce the amount of imbalance to the utmost. However, in order to improve the rigidity of the crankshaft, it is required to increase the diameter of the bearing for the crankshaft. As a result, there arise problems such as a gain in the weight, an increase of the friction loss due to a rise of the sliding speed of the bearing portion, a drop of the engine output, and the like. Further, when the number of the counterweights is increased in order to reduce the amount of the imbalance, the crankshaft has become larger in the size. Accordingly, there arises a problem that the positioning of the connecting rod, piston, etc is restricted, so that it becomes impossible to make an engine smaller in the size.

Then, in the prior art, a flywheel is constructed in a structure as shown in FIG. 13 and FIG. 14 so as to absorb the vibration due to the bending and twisting generated on the crankshaft.

Incidentally, FIG. 13 is a sectional view taken on line XIII—XIII of FIG. 14. Referring to the drawing, in the central portion of the end surface of the engine crankshaft 1 is integrally formed a cylindrical projection 1*a* projecting outward. The cylindrical projection 1*a* is inserted in a central hole of a plate portion 3 of a flywheel 2, which plate portion 3 is joined to the end surface of the crankshaft 1 through a plurality of flywheel fitting bolts 7, 7 arranged annularly at intervals. On the periphery of the plate portion 3 is fixed a flywheel mass portion 4 provided with a clutch facing surface 4*a* through mass portion fitting bolts 5, 5.

The plate portion 3 of the flywheel 2 is made of a thin plate, so that a circular reinforcement 6 is used in order to make the tightening force of the flywheel fitting bolts 7, 7 act uniformly. The plate portion 3 is clamped between the reinforcement 6 and the end surface of the crankshaft so as to be joined thereto.

Around the circumference of the crankshaft 1, a rip seal 8 is provided in order to seal the lubricating oil from the inside of the engine, and a rip-seal retainer 9 is provided in order to fix this rip seal 8.

Besides, for the purpose of avoiding the interference with this rip seal 8 and rip-seal retainer 9 and of making efficient use of the space, the plate portion 3 is bent toward the engine body at a position spaced slightly away from the end surface of the crankshaft 1.

In this manner, the flywheel 2 having the plate portion 3 made of a thin plate is designed so as to absorb the vibration due to the bending and twisting generated on the crankshaft 1 by means of this thin plate portion 3.

However, for the large bending and twisting of the crankshaft 1, as shown in FIG. 15, the stress is concentrated on the periphery of the plate portion 3 away from the end surface of the crankshaft 1 due to the amplitude of the flywheel mass portion 4, so that there is a possibility that the plate portion 3 is damaged at this region of stress concentration P.

As a way of dealing with this problem, as shown in FIG. 16, a vibration-damping belleville spring 10 shown in FIG. 17 is disposed between the flywheel mass portion 4 and the plate portion 3. The vibration-damping belleville spring 10 is capable of damping the amplitude of the flywheel mass portion 4 to reduce the stress concentration.

However, for the structure shown in FIG. 16, there arise new problems as follows. Namely, it is required to machine the flywheel mass portion 4 so as to insert the vibration-damping belleville spring 10, so that the number of component parts is increased. Further, the amount of imbalance on the entire flywheel 2 is increased after assembling the vibration-damping belleville spring 10, so that it takes time to adjust the balancing and the cost is raised.

Therefore, it is an object of the present invention to provide a flywheel that is capable of being efficiently assembled with preventing the number of parts from increasing and capable of controlling the vibration of the flywheel mass portion effectively.

DISCLOSURE OF THE INVENTION

In order to achieve the above object, in a flywheel defined in claim 1 of the present invention, a central part of a thin plate portion having a flywheel mass provided on an outer peripheral side of the plate portion is joined to an end surface of a crankshaft through a plurality of bolts disposed annularly at intervals. Within a contact zone of a substantially polygon defined by linking each center of the bolts with straight lines excluding the bearing surfaces of the bolts, the plate portion has a non-contacting part set not to contact with the end surface of the crankshaft, and the area of the non-contacting part is set to be 40% to 75% of the whole area of the contact zone.

According to claim 1 of the present invention, the load fluctuating area between the plate portion and the end surface of the crankshaft is enlarged, so that it becomes possible to control the vibration and amplitude on the outer peripheral side of the plate portion, and to obtain the stable effect of damping the amplitude.

In a flywheel defined in claim 2 of the present invention, a central part of a thin plate portion having a flywheel mass provided on an outer peripheral side of the plate portion is clamped between a reinforcement and an end surface of a crank shaft and is joined thereto through a plurality of bolts disposed annularly at intervals. Within a contact zone of a substantially polygon defined by linking each center of the bolts with straight lines excluding the bearing surfaces of the bolts, the reinforcement has a non-contacting part set not to contact with the plate portion, and the area of the non-contacting part is set to be 40% to 75% of the whole area of the contact zone.

According to claim 2 of the present invention, the load fluctuating area between the reinforcement and the plate portion is enlarged, so that it becomes possible to control the vibration and amplitude on the outer peripheral side of the plate portion.

Further, in claim 3 of the present invention, the plate portion is provided with a non-contacting part that does not contact with the end surface of the crankshaft.

According to claim 3 of the present invention, the load fluctuating areas between the plate portion and the end surface of the crankshaft and between the reinforcement and the plate portion are enlarged, so that it becomes possible to control the vibration and amplitude on the peripheral side of the plate portion, and to obtain the stable effect of damping the amplitude.

Other advantageous features of the invention will be obvious after a reading of the following detailed description of the preferred embodiment shown in the drawings as follows.

BRIEF DESCRIPTION OF THE DRAWINGS

FIG. 4 is a sectional view of the major parts of a mounted state of a plate portion for a flywheel according to a second embodiment (corresponding to the major parts of the sectional view taken along line XIII—XIII in FIG. 14);

FIG. 5 is a sectional view of the major parts of a mounted state of a plate portion for a flywheel according to a third embodiment (corresponding to the major parts of the sectional view taken along line XIII—XIII in FIG. 14);

FIG. 11 is an illustration of the occurrence of sips around the periphery of an elastic ball under the variation of load (increased load);

DESCRIPTION OF THE PREFERRED EMBODIMENTS

Hereinafter, embodiments of the present invention will be described with reference to the drawings.

Figure 1:
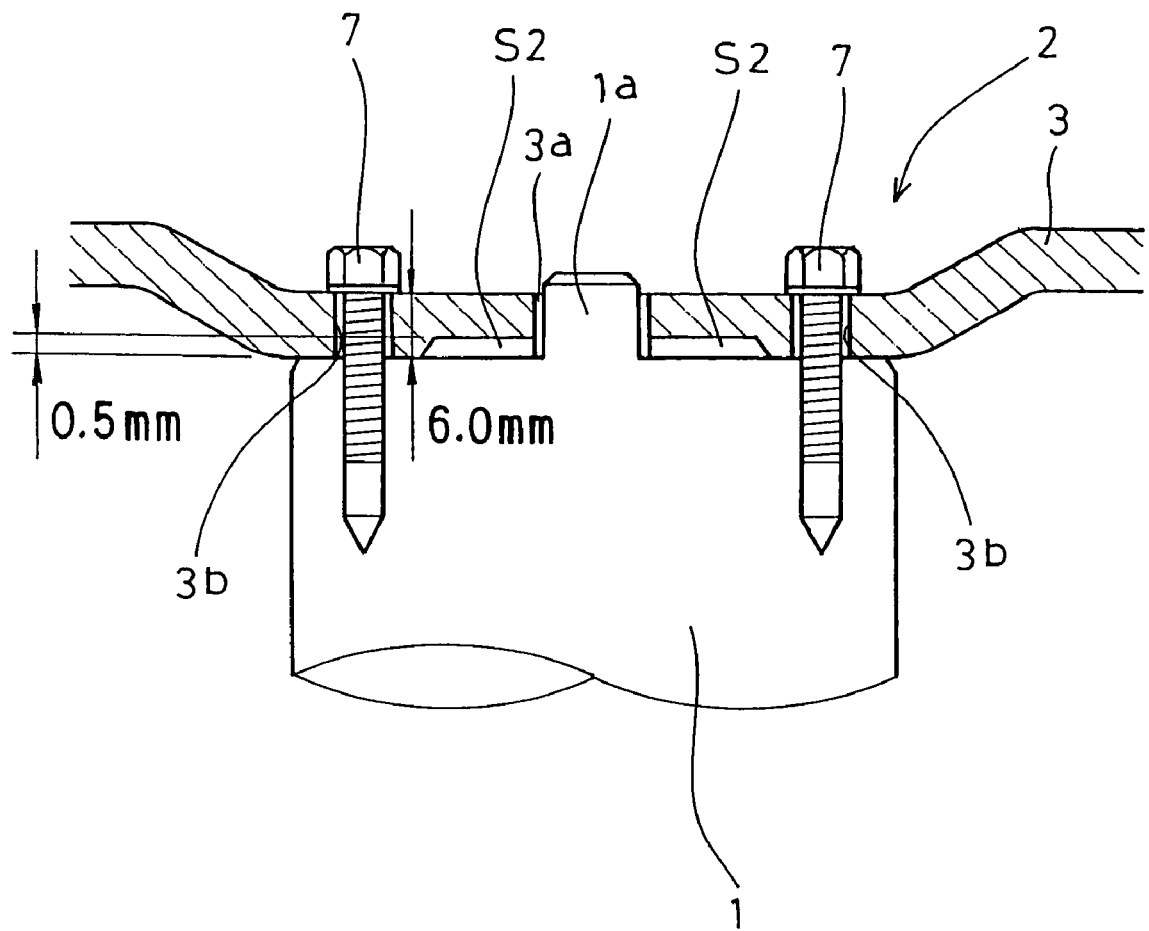
FIG. 1 is a sectional view of the major parts of a mounted state of a plate portion for a flywheel according to a first embodiment (corresponding to the major parts of the sectional view taken along line XIII—XIII in FIG. 14)
Figure 14:
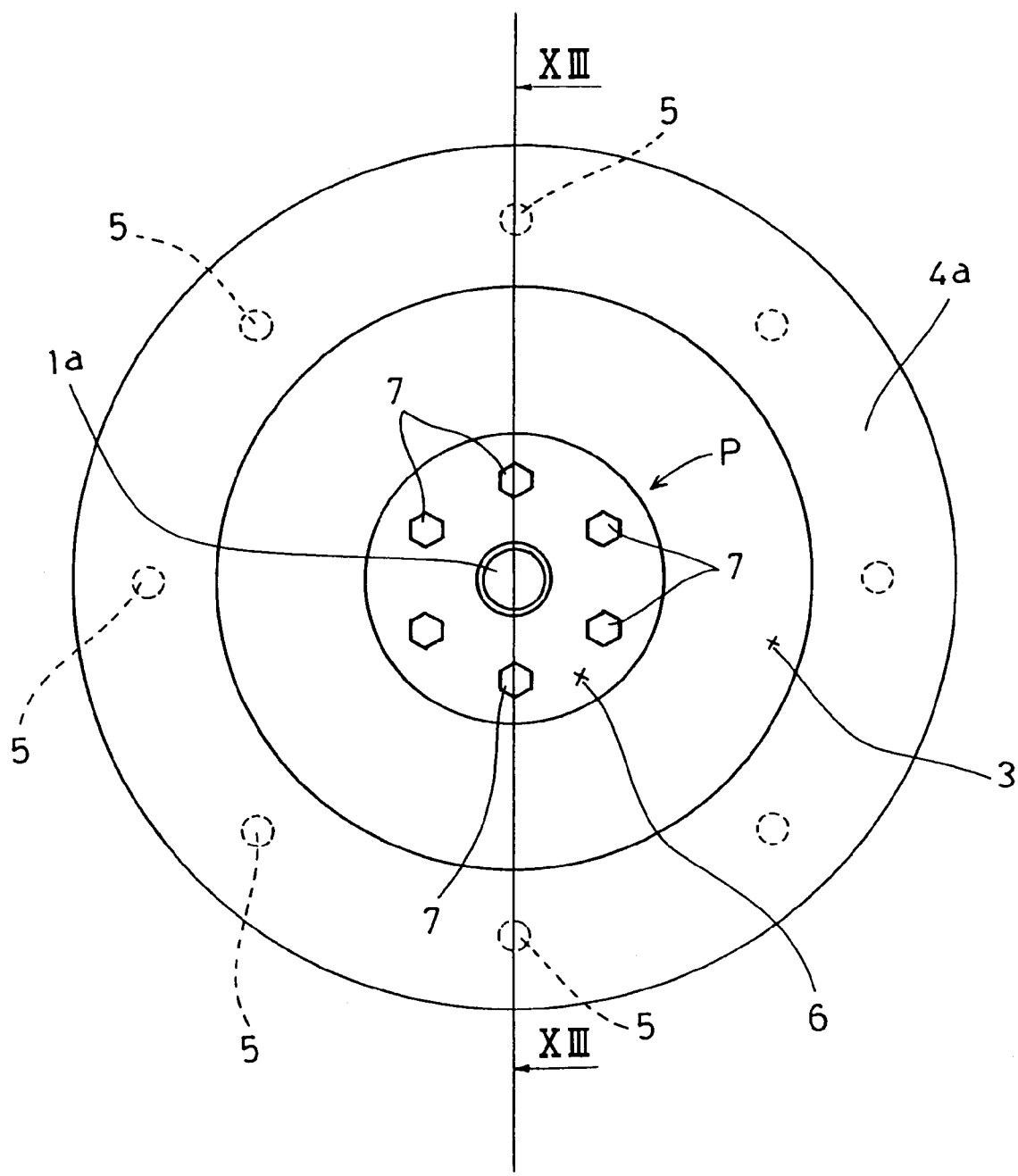
FIG. 14 is a side structural view of FIG. 13.
Figure 15:
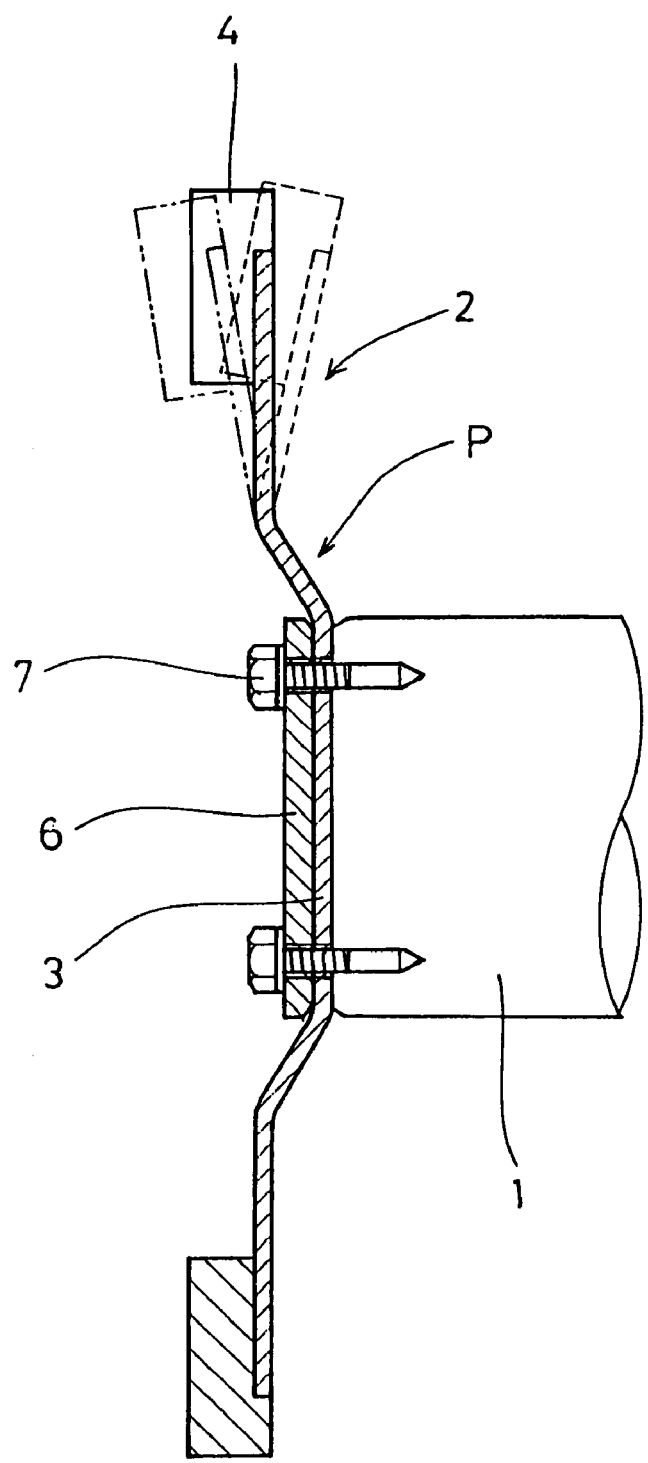
FIG. 15 is an illustration of a vibrating state of the flywheel mass portion provided in the outer periphery of the plate portion.
Figure 16:
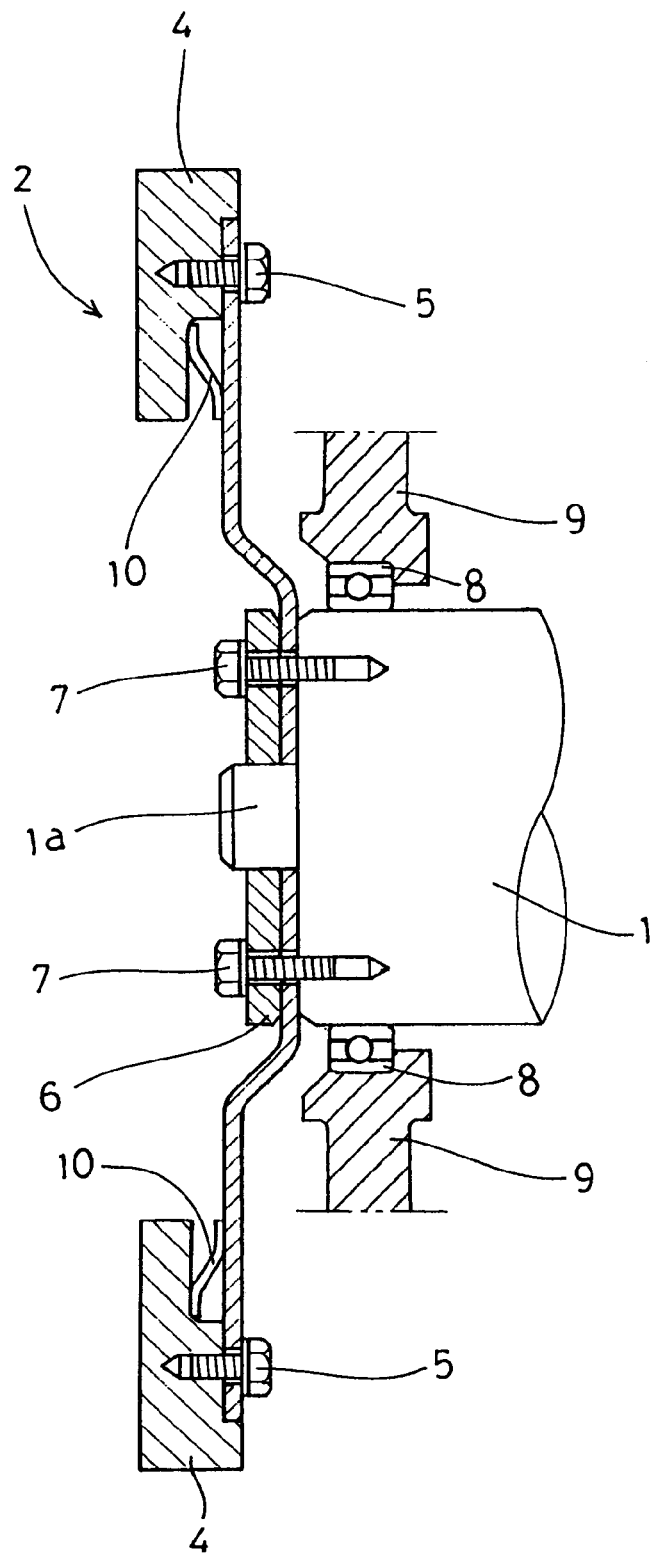
FIG. 16 is a sectional structural view of a mounted state of a conventional flywheel provided with a vibration-damping belleville spring.
Figure 17:
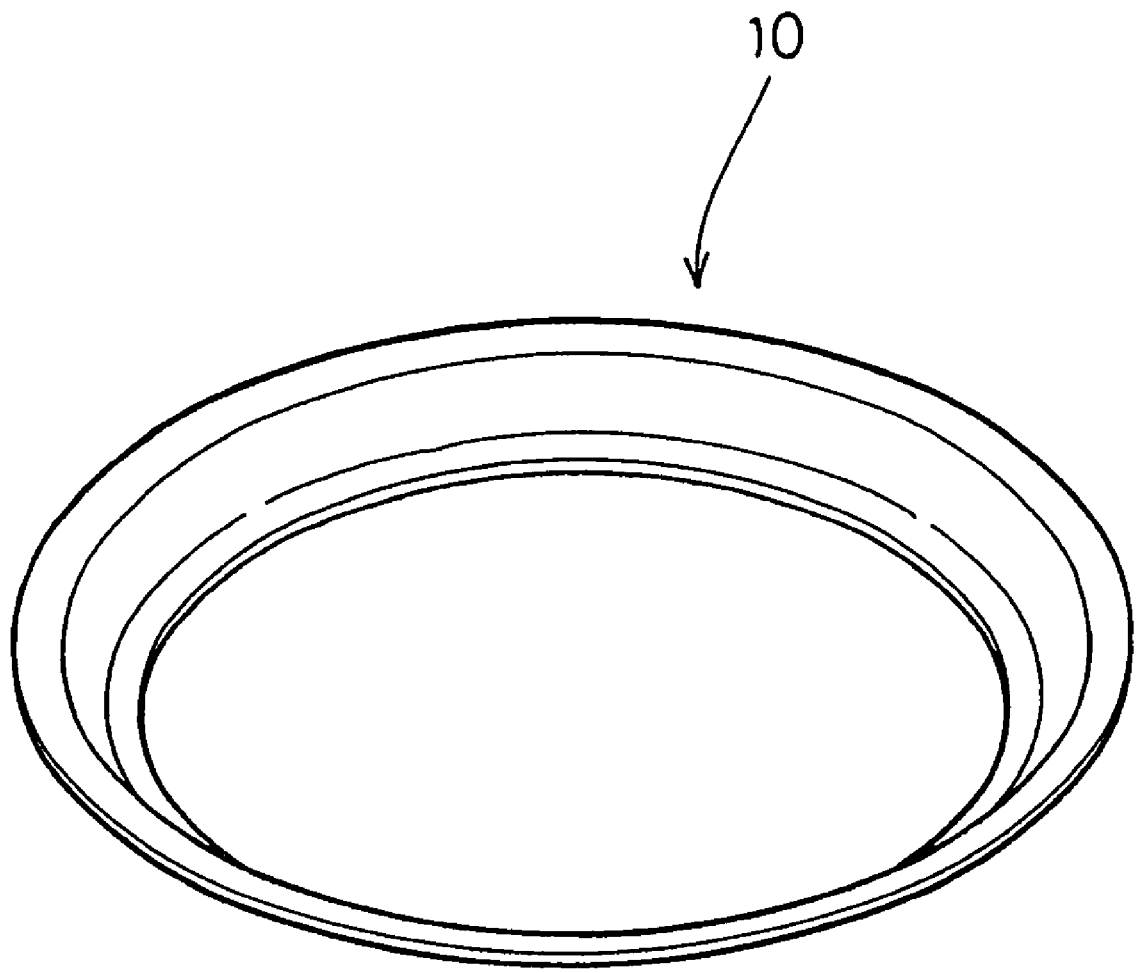
FIG. 17 is a perspective view of a vibration-damping belleville spring.

FIG. 1 shows a mounting structure for a flywheel according to a first embodiment and corresponds to the major parts of the sectional view taken along line Y—Y in FIG. 14.

A flywheel 2 is composed of a plate portion 3, on the outer peripheral side of which a flywheel mass portion 4 is mounted through bolts 5. The plate portion 3 is made of a plate having a thickness of about 6 mm. In case of this embodiment, the plate portion 3 is joined to the end surface of a crankshaft 1 through a plurality of flywheel fitting bolts 7, 7 without use of a reinforce 6.

A cylindrical projection 1a is provided on the central portion of the end surface of the crankshaft 1 and is fitted into a central hole 3a formed in the center of the plate portion 3. On the outer peripheral side of the central hole 3a of the plate portion 3, six bolt holes 3b, 3b are formed therethrough and arranged annularly at designated intervals to let the bolts 7, 7 fit through.

The flywheel fitting bolt 7 is inserted into each bolt hole 3b from the outside and tightened to the end surface of the crankshaft 7. Through a plurality of the flywheel fitting bolts 7, 7 the plate portion 3 of the flywheel 2 is joined to the end surface of the crankshaft 1.

In the central portion of the backside of the plate portion 3, that is, in the surface to be joined to the end surface of the crank shaft 1, there is formed a non-contacting part S2 in hollow fashion. The depth of the hollow of this noncontacting surface S2 is set to be 0.5 mm.

Accordingly, in the state that the plate portion 3 is joined to the end surface of the crankshaft 1, this non-contacting surface S2 is set to be floating up so as not to contact with the end surface of the crankshaft 1.

Figure 2:
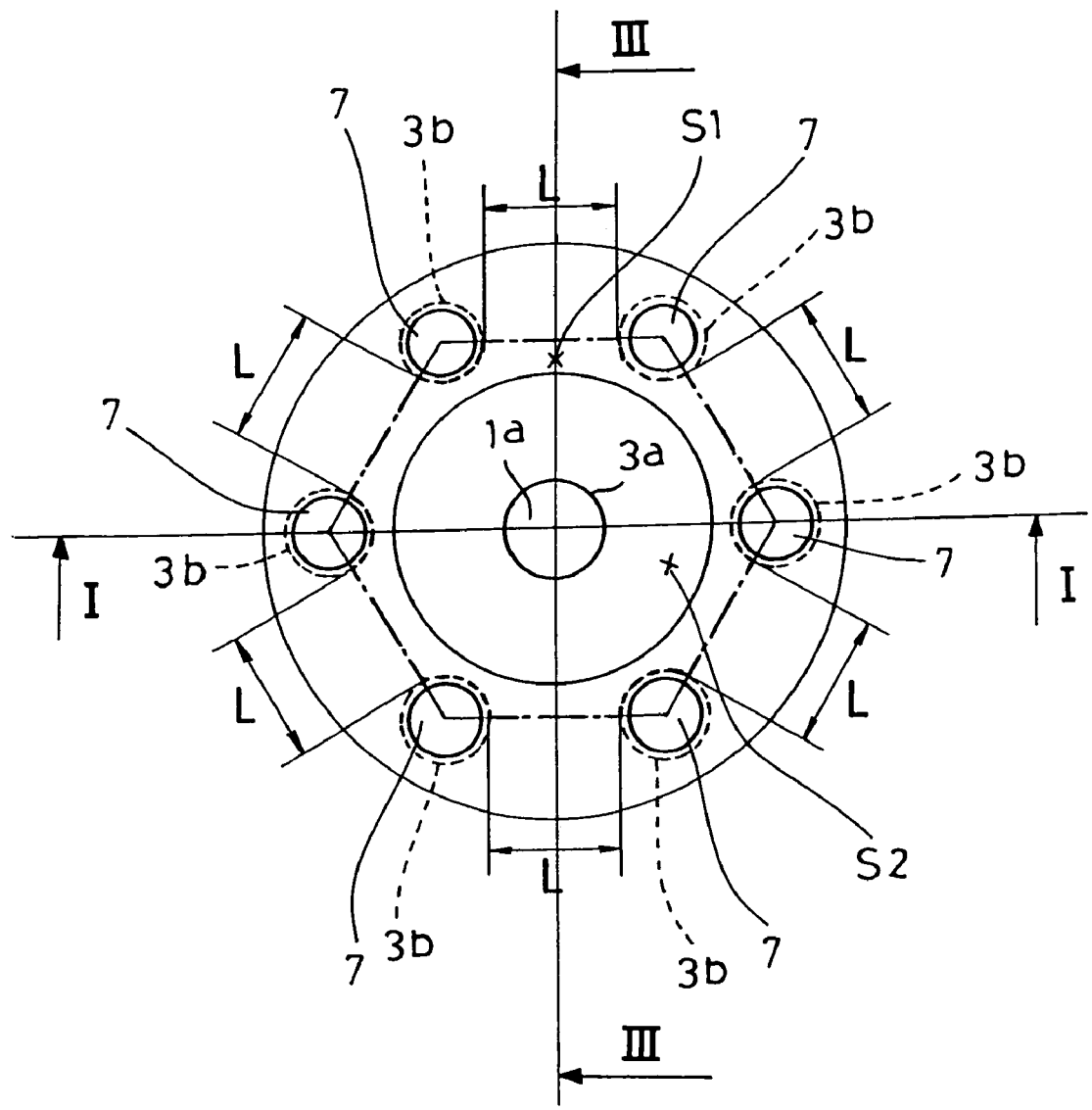
FIG. 2 is a side view of an arrangement of the flywheel fitting bolts in FIG. 1.

In this embodiment, as shown in FIG. 2, the distance L between the bearing surfaces of the flywheel fitting bolts 7, 7 is set to be 7 mm or more. A plurality of the flywheel fitting bolts 7, 7 are annularly arranged at intervals of 7 mm or more. When the centers of those flywheel fitting bolts 7, 7 are linked each other, there is made a hexagonal shape. Further, when the bearing surfaces of the flywheel fitting bolts 7 are deducted from this hexagonal zone, there is formed a contact zone S1 that has a substantially hexagonal configuration a non-contacting part S2 is formed in this contact zone S1 to have a circular configuration having a diameter D1.

The area of this non-contacting part S2 is set to be 40% to 75% of the whole area of the contact zone S1 that is a substantially hexagon and is formed by linking the centers of the flywheel fitting bolts 7, 7, excluding the bearing surfaces of the flywheel fitting bolts 7.

Figure 7:
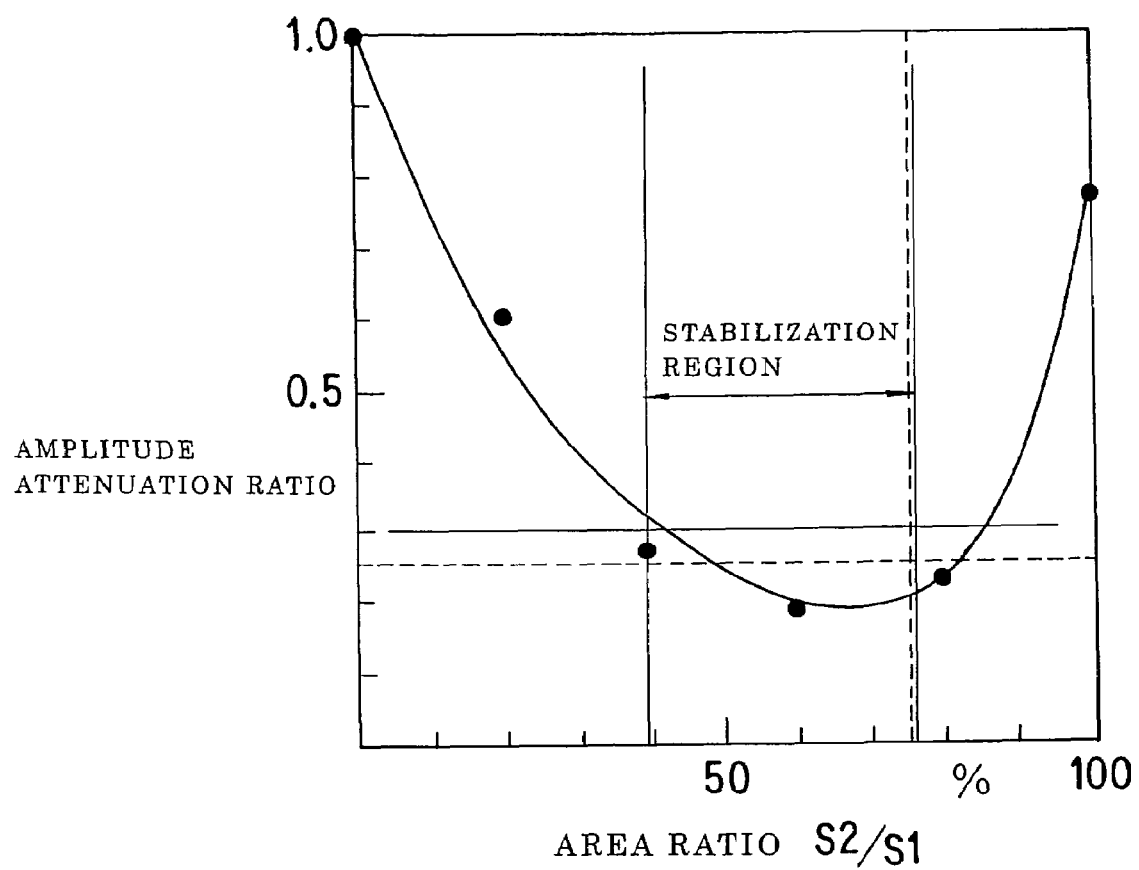
FIG. 7 is a graph of a relation between the amplitude damping factor and the area ratio of the non-contacting part to the whole area of the contact zone.

FIG. 7 shows a result of an actual measurement.

As shown in FIG. 7, in proportion as the area ratio of the non-contacting part S2 to the contacting part S1 increases, the damping ratio of the vibration of the flywheel mass portion 4 decreases sharply until the area ratio reaches to 40%; the damping ratio is about 0.3 at the area ratio of 40%. Until the area ratio of 70%, the damping ratio is stabled to be 0.3 or less, and when exceeding the area ratio of 75%, the damping ratio decreases sharply.

According to the result of this actual measurement, the area ratio of the non-contacting part S2 to the whole contact zone S1 is set within the range between 40% and 75% where the damping effect of the amplitude of the flywheel mass portion 4 is great and stable.

It is conceivable that such a damping effect of the amplitude has resulted from increase of the load fluctuating area E corresponding to the amplitude fluctuation because the noncontacting part S2 is formed in hollow fashion in the backside of the plate portion 3.

Figure 3:
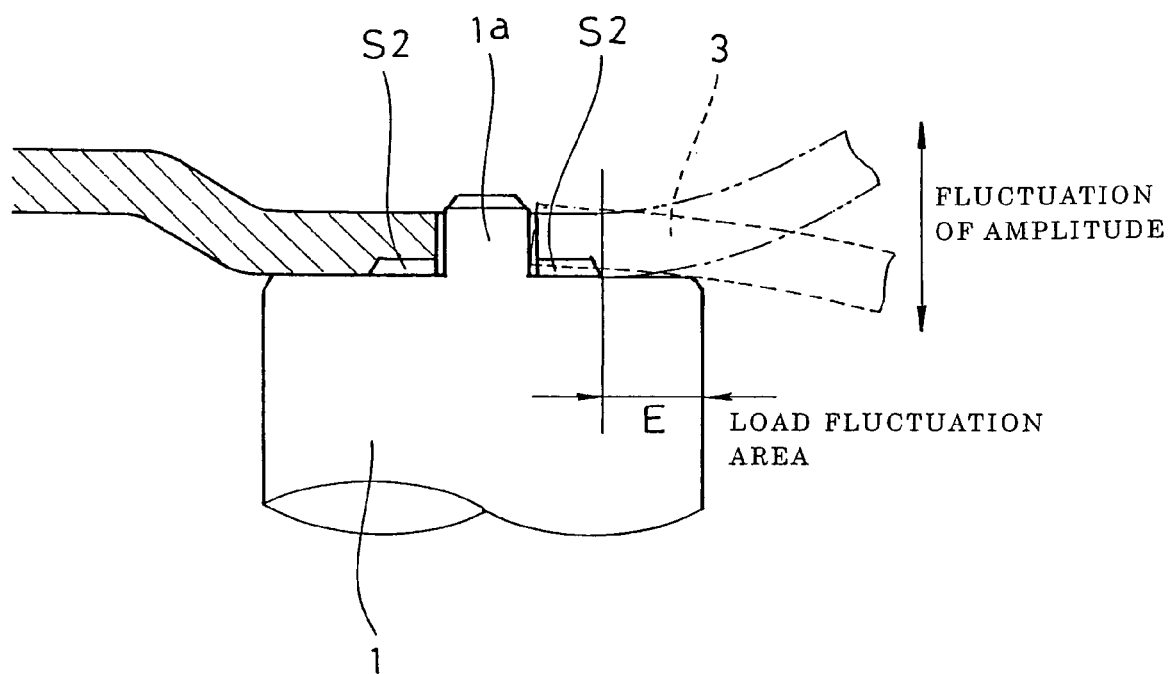
FIG. 3 is a sectional illustration of the major parts of a mounted state of a plate portion.
Figure 18:
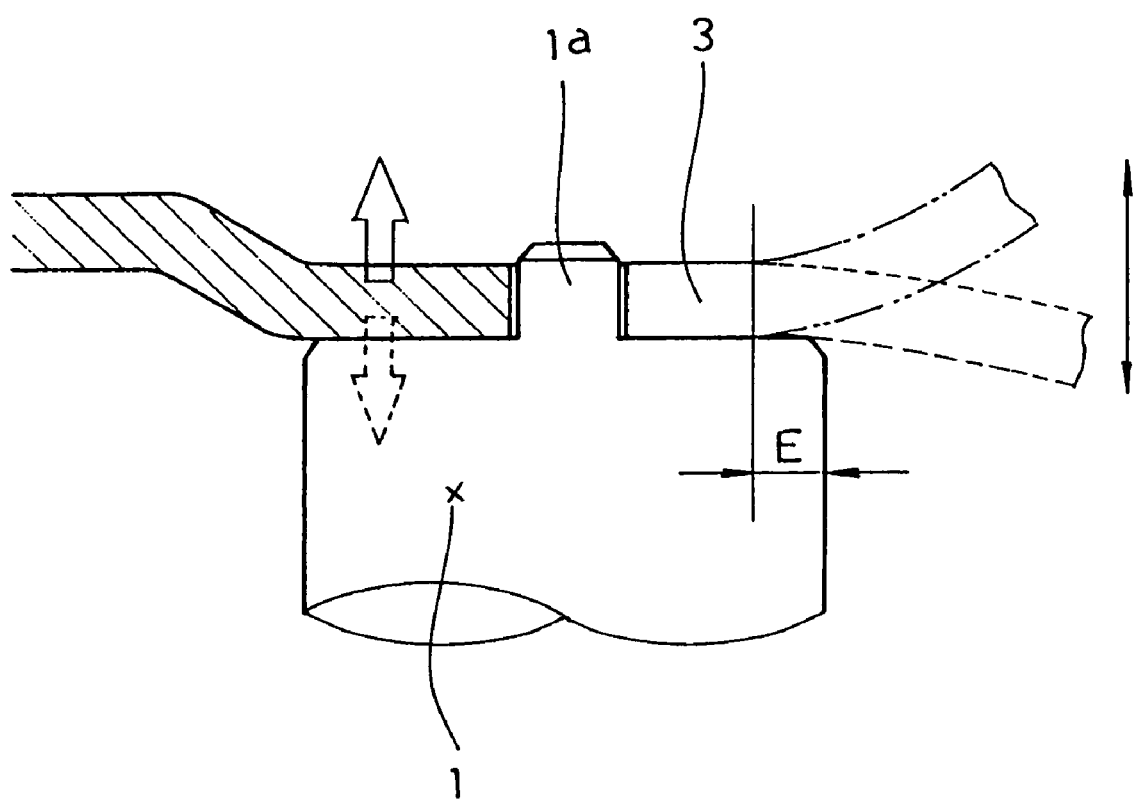
FIG. 18 is a sectional illustration of the major parts of a mounted state of a conventional plate portion.

Namely, in a conventional structure, as shown in FIG. 18, since the plate portion 3 keeps in surface contact with the whole area of the end surface of the crankshaft 1, the deforming region of the plate portion 3 corresponding to the amplitude fluctuation of the flywheel mass portion 4, that is the load fluctuating area E, is narrow. On the other hand, in this embodiment, as shown in FIG. 3, since the noncontacting part S2 is formed, the plate portion 3 does not keep in surface contact with the whole area of the end surface of the crankshaft 1. Accordingly, the deforming region of the plate portion 3 corresponding to the amplitude fluctuation of the flywheel mass portion 4 is extended, so that the load fluctuating area E is increased as compared with the prior art.

In this load fluctuating area E, a minute relative displacement between the contact surface of the plate portion 3 and the end surface of the crankshaft 1 generates a friction force, by which is obtained the amplitude damping effect of the flywheel mass portion 4. Namely, since the load fluctuating area E is increased more than the prior art, it is conceivable that the amplitude can be effectively reduced as compared with the prior art.

Figure 8:
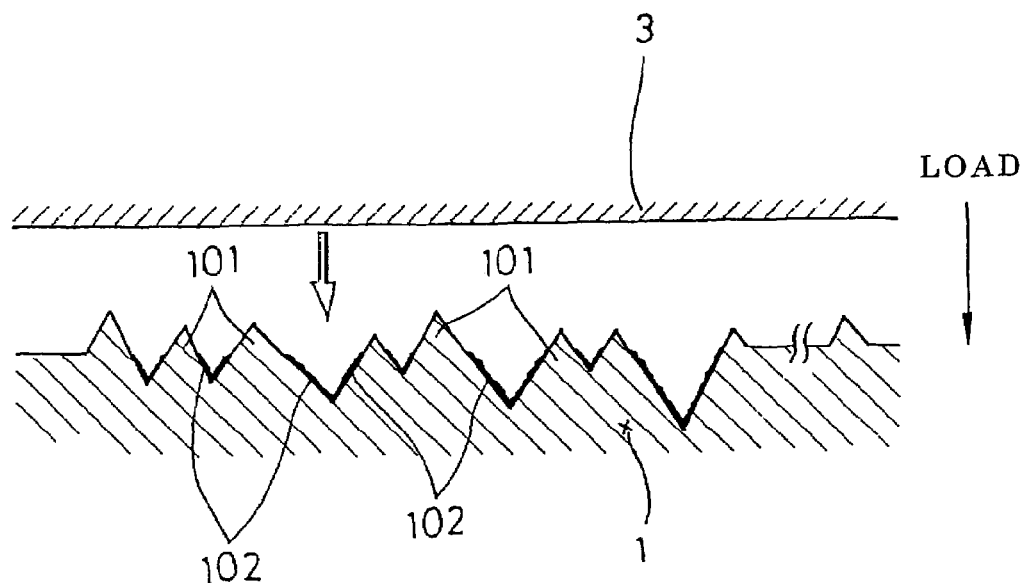
FIG. 8 is an enlarged view of a surface roughness of the contact surfaces between the plate portion and crankshaft.
Figure 9:
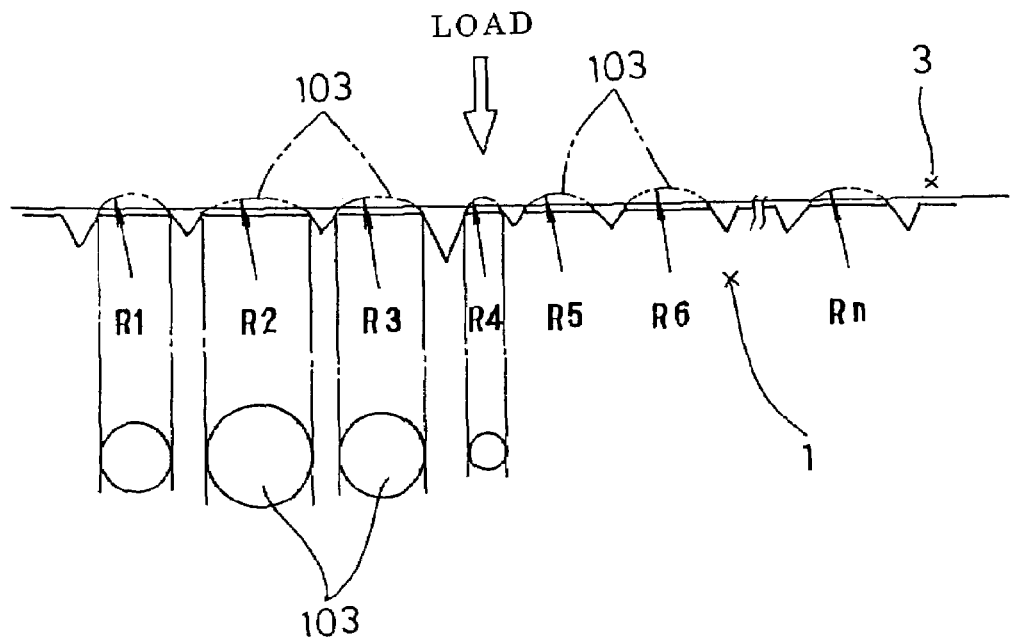
FIG. 9 is an enlarged view of a surface formed with elastic recovery balls due to plastic flow under a load.

Namely, as shown in FIG. 8, both the surfaces of the plate portion 3 and the end surface of the crankshaft 1 are the machined surfaces or the rough surfaces by press, sintering, and the like and inevitably have surface roughness. When both the surfaces are pressed against each other by tightening with the flywheel fitting bolts 7, 7, the tip ends of the projecting parts 101, 101 composing surface roughness are crushed and spreaded around by plastic flow to be plastic flow portions 102, 102. Those plastic flow portions 102, 102 are recovered by elasticity to be a number of elastic recovery globes 103, 103 having different radii R1, R2, R3, R4, R5, and R6, as shown in FIG. 9. In the region of the plate portion 3 pressed against the end surface of the crankshaft 1, those elastic recovery globes 103, 103 are in contact with each other.

Figure 10:
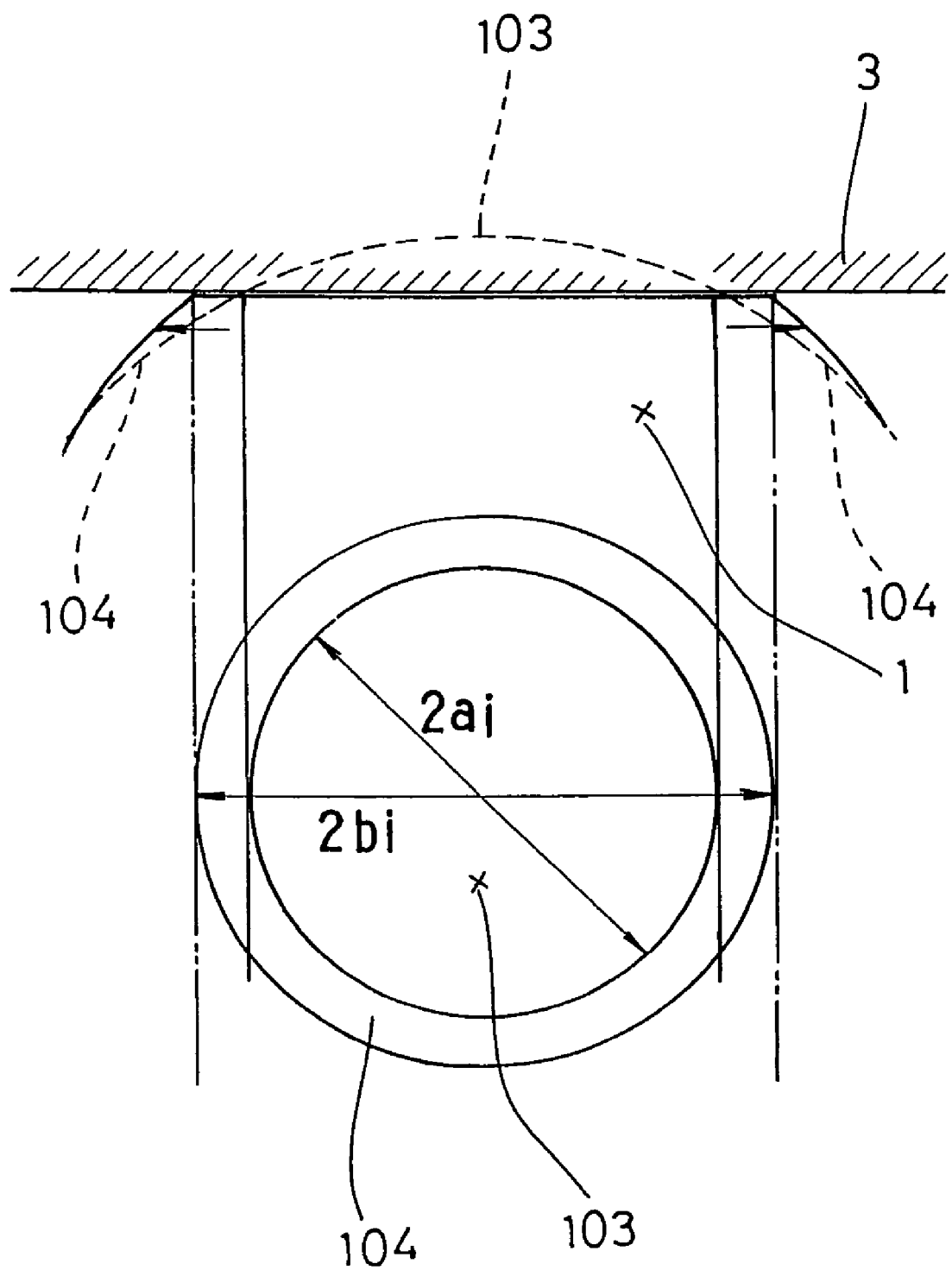
FIG. 10 is an enlarged view of an elastic ball.

One of those elastic recovery globes 103, 103 will be described in the enlarged view of FIG. 10.

In the elastic recovery glove 103, the contact region (the circle of diameter $2ai$) is firmly fixed, but the outside annular region 104 of diameter $2bi$ is elastically deformed toward outside when depressed by a load.

When the load fluctuation occurs in such a state, the region that is not fixed and elastically deformed toward outside, is changed, so that between this region and the inside contact region is produced a relative displacement. Accordingly, a slide occurs between the surfaces due to the elastic deformation, and here is generated a friction force, so that the force acts in the direction to prevent the elastic deformation.

FIG. 11 shows the case that the load has increased according to the amplitude of the flywheel mass portion 4. The contact region of diameter $2ai$ is extended to diameter $2a'i$, and the annular region 104 of diameter $2bi$ is extended to diameter $2b'i$; those are elastically deformed toward outside.

Figure 12:
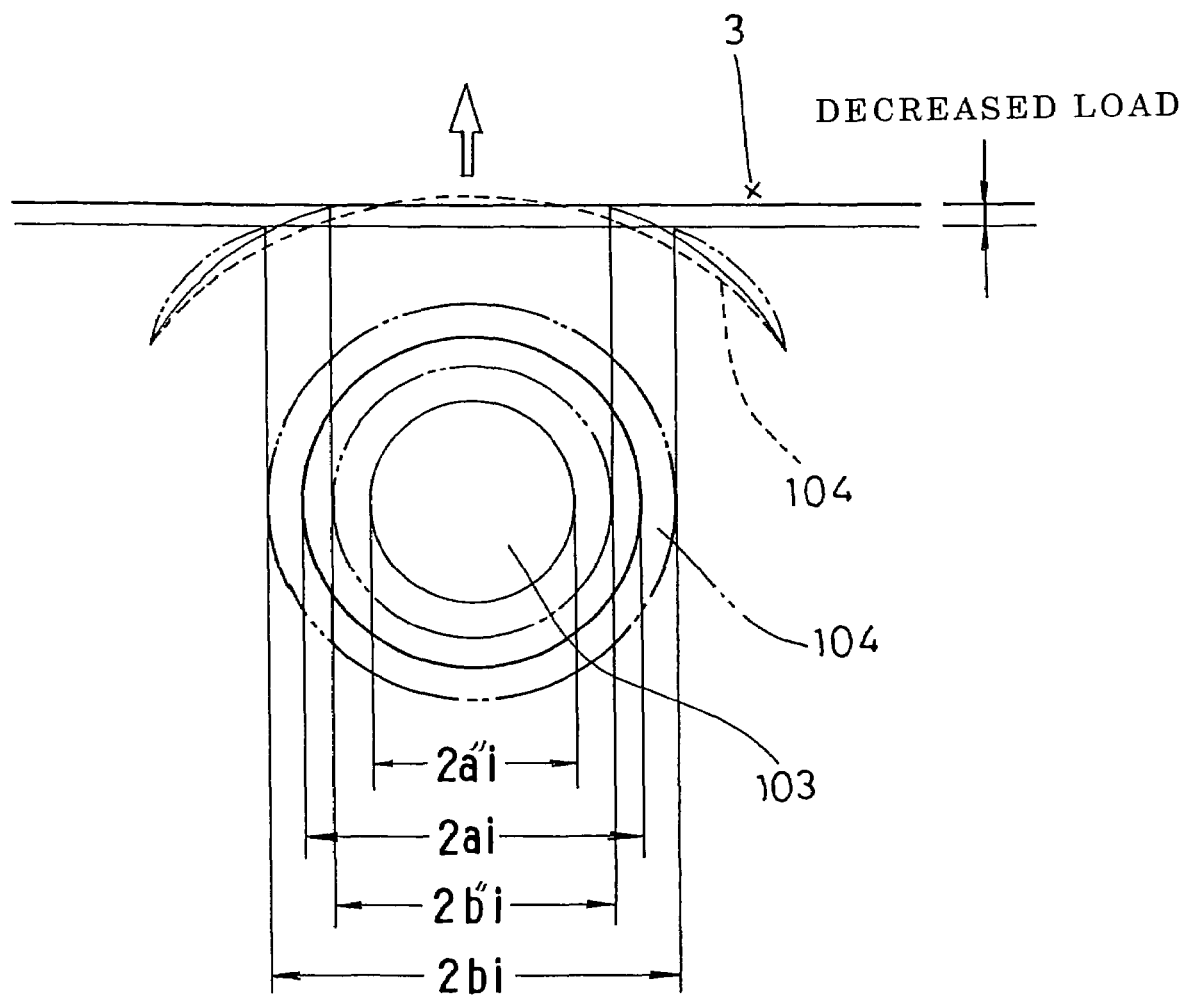
FIG. 12 is an illustration of the occurrence of sips around the periphery of an elastic ball under the variation of load (decreased load)
Figure 13:
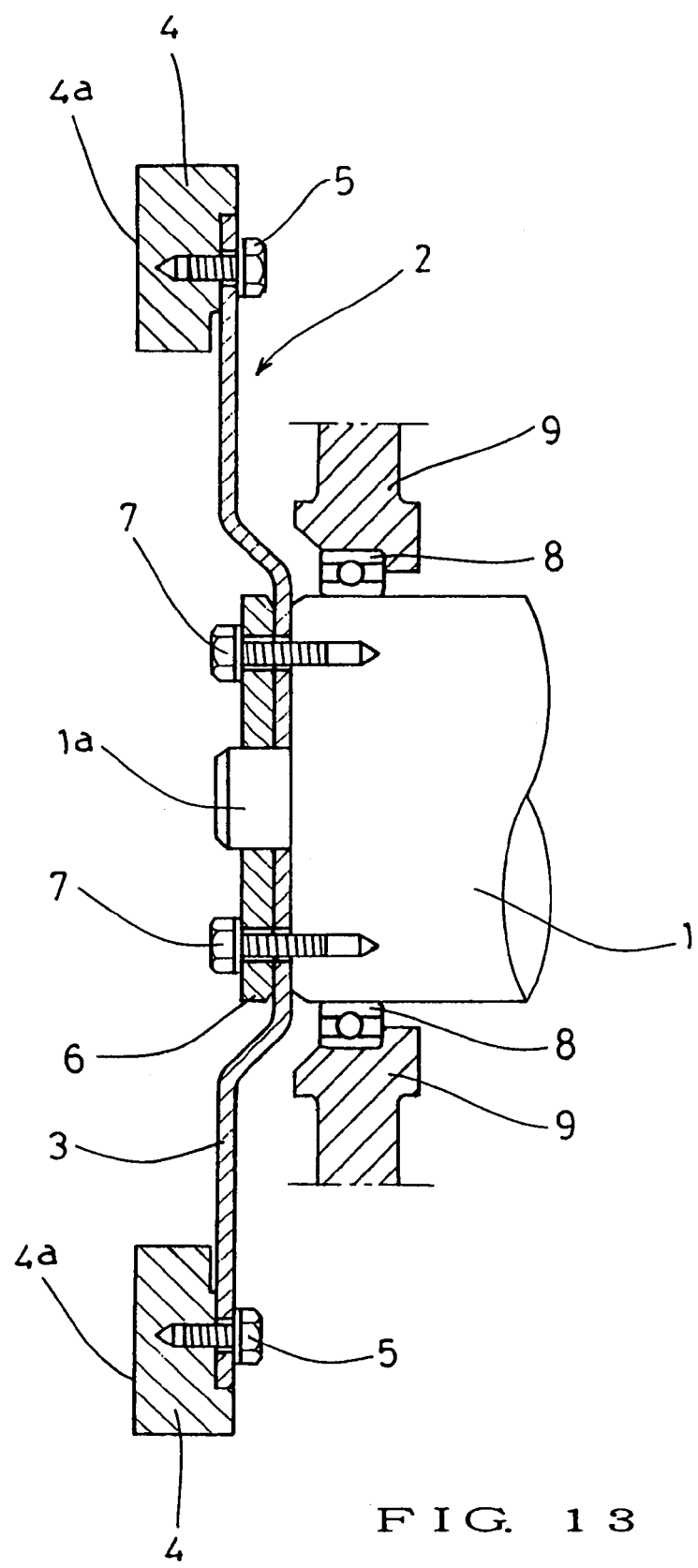
FIG. 13 is a sectional view of a mounted state of a conventional flywheel (a sectional view taken along line XIII—XIII in FIG. 14)

Conversely, in the case that the load has decreased according to the amplitude, as shown in FIG. 12, the contact region of diameter $2ai$ is reduced to diameter $2a''i$, and the annular region 104 of diameter $2bi$ is reduced to diameter $2b''i$.

In this manner, according to the load fluctuation due to the amplitude, a friction force acts between the surfaces, and the force serves in the direction to prevent the load fluctuation. As a result, it becomes possible to obtain an effect of damping the vibration, namely controlling the vibration and amplitude of the periphery of the plate portion 3. Further, it becomes possible to lower the stress in the region of stress concentration P of the plate portion 3 in the vicinity of the end surface of the crankshaft 1.

Namely, according to this embodiment, the non-contacting part S2 is formed in the plate portion 3 so that the load fluctuation area E may be increased between the plate portion 3 and the end surface of the crankshaft 1. As a result, the amplitude damping effect of the flywheel mass portion 4 is obtained by a friction force due to a minute relative displacement between these surfaces.

Next, FIG. 4 shows a second embodiment.

In FIG. 14, the plate portion 3 is composed of a thin plate having the thickness of 2.9 mm, so that the plate portion 3 is covered with a reinforcement 6 having the thickness of 3.2 mm to be joined to the end surface of the crankshaft 1 by tightening the bolts 7, 7.

According to this embodiment, the non-contacting part S3 is formed in hollow fashion in the back of the reinforcement 6, namely in the central portion of the surface to be in contact with the plate portion 3.

Namely, this noncontacting part S3 is a portion of the reinforcement 6 that is not in contact with the plate portion 3. The area of this noncontacting part S3 is set to be 40% to 75% to the whole area of the contact zone S1 as shown in FIG. 2.

Accordingly, in FIG. 4 it becomes possible to reduce the vibration and amplitude on the outer peripheral side of the plate portion 3 by enlarging the load fluctuating area E between the reinforcement 6 and the plate portion 3.

Further, FIG. 5 shows a third embodiment. In FIG. 5, the plate portion 3 is clamped between the reinforcement 6 and the end surface of the crankshaft 1. This plate portion 3 has the thickness of 2.9 mm. The reinforcement 6 has the thickness of 3.2 mm.

In this embodiment, the non-contacting part S2 is formed in hollow fashion in the back of the plate portion 3, namely in the surface facing the end surface of the crankshaft 1, and further another non-contacting part S3 is formed in hollow fashion in the back of the reinforcement 6, namely in the surface to be in contact with the plate portion 3.

In this manner, the plate portion 3 and the reinforcement 6 are respectively provided with the non-contacting parts S2 and S3, so that the load fluctuation area E can be enlarged more effectively. As a result, it becomes possible to reduce the vibration and the amplitude of the periphery of the plate portion 3.

Figure 6:
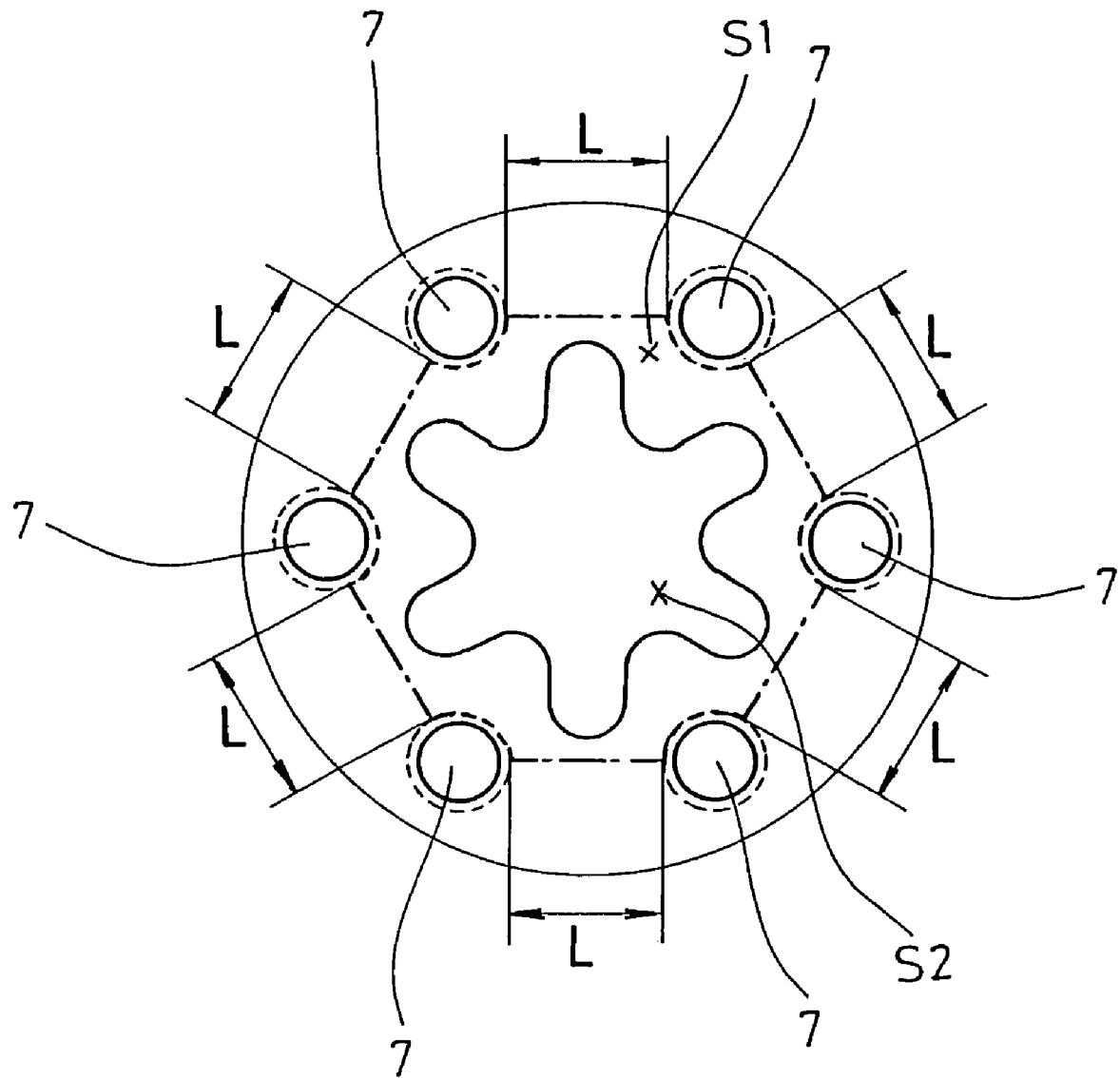
FIG. 6 is a side view of an arrangement of the flywheel fitting bolts in the case of the non-contacting part deformed in a petal-like shape.

Further, as shown in FIG. 6, each of the non-contacting parts S2 and S3 may be formed in a shape such as petals and the like other than a circle. Namely, the area of each of the non-contacting parts S2 and S3 is set to be 40% to 75% of the whole area of the contact zone S1 that is a substantially polygon and is made by linking each center of a plurality of the bolts 7, 7 without the bearing surfaces of the bolts 7, 7. In this manner, by enlarging the load fluctuating area E effectively, it becomes possible to reduce the vibration and the amplitude on the outer peripheral side of the plate portion 3.

The invention claimed is:

1. A flywheel in which a central part of a plate portion having a flywheel mass provided on an outer peripheral side of the plate portion is joined to an end surface of a crankshaft through a plurality of bolts disposed annularly at intervals, wherein, within a contact zone of a polygon defined by linking each center of the bolts with straight lines excluding the bearing surfaces of the bolts, the plate portion has a non-contacting part set not to contact with the end surface of the crankshaft, the non-contact part is formed in a hollow fashion in a central portion of a surface of the plate portion, which surface contacts the end surface of the crankshaft, and the area of the non-contacting part is set to be 40% to 75% of the whole area of the contact zone.

2. A flywheel as defined in claim 1, wherein a central hole is formed in a center portion of the plate portion.

3. A flywheel as defined in claim 2, wherein the crankshaft has a cylindrical projection on the central portion of the end surface of the crankshaft, and the central hole of the plate portion is formed to be fitted with the cylindrical projection.

4. A flywheel in which a central part of a plate portion having a flywheel mass provided on an outer peripheral side of the plate portion is clamped between a reinforcement and an end surface of a crank shaft and is joined thereto through a plurality of bolts disposed annularly at intervals, wherein, within a contact zone of a polygon defined by linking each center of the bolts with straight lines excluding the bearing surfaces of the bolts, the reinforcement has a non-contacting part set not to contact with the plate portion, the non-contact part is formed in a hollow fashion in a central portion of a surface of the reinforcement, which surface contacts the plate portion, and the area of the non-contacting part is set to be 40% to 75% of the whole area of the contact zone.

5. A flywheel as defined in claim 4, wherein the plate portion is provided with a non-contacting part that does not contact with the end surface of the crankshaft, and the non-contact portion is formed in a hollow fashion in a central portion of a surface of the plate portion, which surface contacts the end surface of the crankshaft.

6. A flywheel as defined in claim 4, wherein a central hole is formed in a center portion of the plate portion.

7. A flywheel as defined in claim 6, wherein the crankshaft has a cylindrical projection on the central portion of the end surface of the crankshaft, and the central hole of the plate portion is formed to be fitted with the cylindrical projection.

* * * * *